United States Patent [19]
Birkenstock et al.

[11] Patent Number: 5,135,665
[45] Date of Patent: Aug. 4, 1992

[54] MULTICHAMBER-CANDLE FILTER ELEMENT

[75] Inventors: Udo Birkenstock, Ratingen; Wolfgang Gay, Odenthal, both of Fed. Rep. of Germany; Glenn Höhle, Männedorf, Switzerland

[73] Assignees: DRM, Dr. Müller AG, Männedorf, Switzerland; Bayer Aktiengesellschaft, Leverkusen, Fed. Rep. of Germany

[21] Appl. No.: 678,819

[22] Filed: Apr. 1, 1991

[30] Foreign Application Priority Data
Apr. 2, 1990 [CH] Switzerland ............... 01092/90

[51] Int. Cl.$^5$ ............................................. B01D 29/17
[52] U.S. Cl. ................................. 210/767; 210/323.2; 210/340; 210/346; 210/438; 210/486
[58] Field of Search ............... 210/323.2, 314, 315, 210/316, 335, 337, 338, 339, 342, 346, 437, 438, 439, 458, 497.01, 497.2, 767, 806, 340, 486

[56] References Cited
U.S. PATENT DOCUMENTS

| | | | |
|---|---|---|---|
| 3,214,023 | 10/1965 | Donner | 210/338 |
| 3,256,997 | 6/1966 | Pall et al. | 210/458 |
| 3,467,256 | 9/1969 | Humbert, Jr. et al. | 210/338 |
| 3,886,072 | 5/1975 | Dezelan et al. | 210/439 |
| 4,773,990 | 9/1988 | Hood, Jr. | 210/439 |

Primary Examiner—Robert A. Dawson
Assistant Examiner—Wanda L. Millard
Attorney, Agent, or Firm—Michael J. Striker

[57] ABSTRACT

Multichamber-candle filter element for filtration of a residual volume of a suspension with rapidly settling solid components, includes at least two chambers (1,2) positioned in succession above each other, a lowest of the chambers being from ½ to 1/10 of a total length of the candle filter element, and a separate filtrate delivery pipe (8,9) extending into each of the chambers to provide a separate filtrate outlet for each chamber and a partition member separating each of the chambers from each other in a fluid-tight manner. The multi-candle filter element also has a fluid-tight cover plate (6) and a fluid-tight bottom plate (3) and fluid permeable walls (14,15).

13 Claims, 2 Drawing Sheets

MULTICHAMBER-CANDLE FILTER ELEMENT

BACKGROUND OF THE INVENTION

The invention relates to a multichamber-candle filter element for filtration of a residual volume of suspension with rapidly settling solid components and its assembly into a filter unit.

In European Patent Application EP-A-O 066 921, a candle filter element of the single chamber type is described. This type of filter element, which is usually suspended in a pressurized container, is suitable for, but limited to, residual volume filtration.

In Swiss Patent Application 658 401, the current filter elements are arranged in a pressurized container. A centrally positioned filter element, which extends up to the deepest point of a conical filter container, is used for residual volume filtration. The filter element is surrounded with a bell-shaped jacket. The unfiltered residual volume from the bottom of the filter container is forced by pressurized gas in the filter container into the space between the jacket and the filter means of the filter candle provided for that and is largely filtered out in this way. A remaining residual volume is still present after this residual volume filtration however, since the pressurized gas, e.g. air or an inert gas, penetrates through the filter candle with a minimum covering layer of fluid.

All known processes with candle filter elements have disadvantages, then above all, when the suspensions having a high solid components content must be filtered. Also on filtration of solid components from a suspension, which should not be comminuted or ground up and which have large grain size or a high specific gravity (of the suspension being filtered), problems occur.

Also a method based on spraying the residual volume into a container during an extended circulation by pumps. Here—the suspended solid particles are ground up—and thus damaged mechanically. The clogging of the spray nozzles can be viewed as an additional disadvantage. A washing of the filter cake and a subsequent discharge of the confined filter cake is difficult.

Furthermore, the solid components of the suspension to be filtered must be deposited on the filter candle element in a limited thickness. As a result, often very large filter surface areas are required according to the amount of the solid components to be separated from the suspension. The separated filter cake is then subjected to a further treatment, such as a washing and/or drying. Of course, no tears or cracks in the filter cake are permitted, otherwise the features of the treatment are incomplete.

SUMMARY OF THE INVENTION

It is an object of the present invention to provide a filter element, which largely filters the residual volume of a suspension having rapidly settling solid components, the suspension being in a container.

It is another object of the present invention to provide a locally fixed filter element for separation of residual volumes of different kinds.

It is an additional object of the present invention to provide an improved method of residual volume filtration of a suspension using the filter element of the invention.

According to the present invention, the multichamber-candle filter element, includes at least two chambers (1,2) positioned in succession above each other, a lowest of the chambers being from ⅛ to 1/10 of a total length of the candle filter element, and a separate filtrate delivery pipe (8,9) extending into each of the chambers. Advantageously a partition member separates each pair of adjacent chambers from each other in a fluid-tight manner.

The filter element comprises thus a short foot portion and an extended head portion. Each chamber of the filter element has its own filtrate delivery pipe. That has the advantage that no air breakthrough can interrupt the residual volume filtration.

The filter element according to the invention is particularly suitable for filtration of suspensions, in which the solid components have a rapid sedimentation rate or settle rapidly.

It is particularly advantageous, when the two filtrate delivery pipes are located coaxial to each other, one inside the other. This makes the manufacture of the filter element easy.

In certain applications it is possible and desirable to position the two filtrate delivery pipes side-by-side.

It is also advantageous that the individual chambers be separated from each other and also that they are fluid-tight, that is fluid cannot leak or pass out of each of the chambers.

A plate has proven best as means of separation of the chambers. However, any other separating means can be used to maintain the fluid-tight separation of the chambers.

In another embodiment of the invention, the filter element can be equipped with a fluid-tight head plate and a fluid-tight foot plate as well as with a fluid permeable wall, the latter with or without filter aids.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
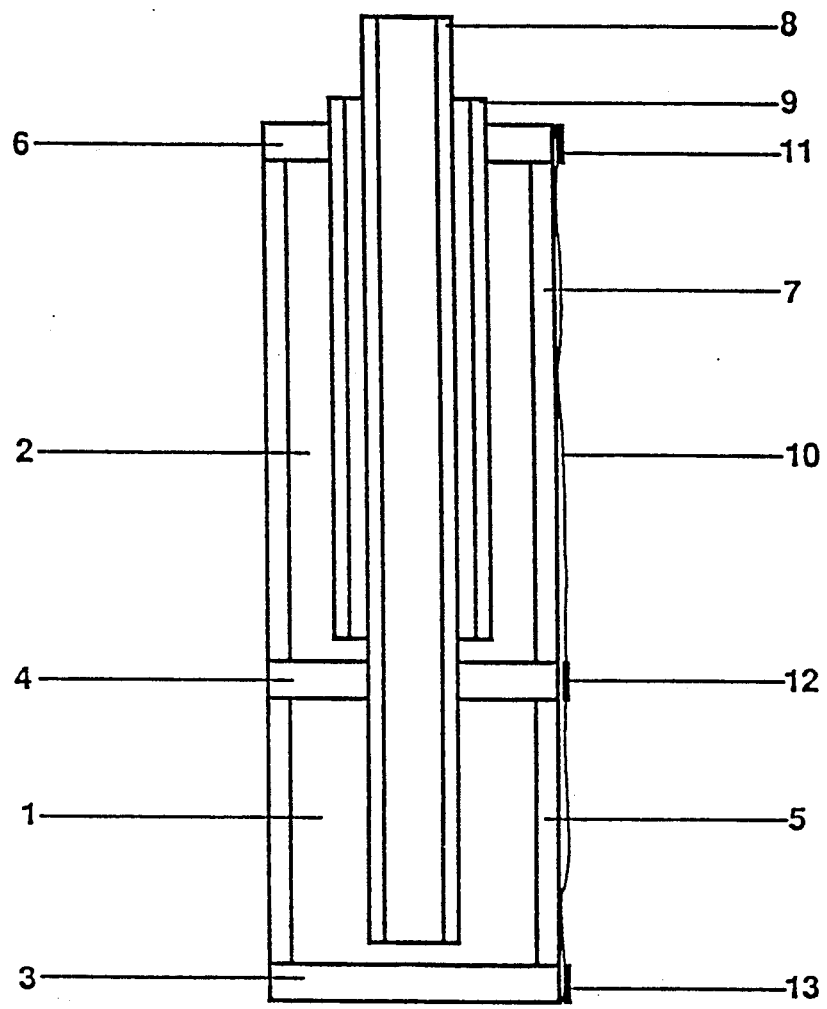
FIG. 1 is a schematic longitudinal cross sectional view through a filter element according to the invention.

The filter element according to FIG. 1 includes a lower chamber 1 and an upper chamber 2. The lower chamber 1 is formed with a bottom plate 3 and a partition member 4, which are spaced from each other by a supporting member 5. The upper chamber 2 is formed by partition member 4 on its bottom side and by a cover plate 6 on its upper end or side. A supporting member 7 separates and spaces apart the partition member 4 and the cover plate 6. The partition member 4 separates the chamber 1 from the chamber 2 in a fluid-tight manner, i.e. neither gas nor liquid exchange between the chambers 1 and 2 occurs. A filtrate delivery pipe 8 extends into the lower chamber 1 and ends in the vicinity of the bottom plate 3, however the spacing between the end of the filtrate delivery pipe 8 and the bottom plate 3 is not critical. Usually that spacing amounts to only a few millimeters. The upper portion of the filtrate delivery pipe 8 leads into a collection chamber for the filtrate, which has not been shown in the drawing. A second filtrate delivery pipe 9 is placed over the outside of the filtrate delivery pipe 8 so that it ends with its lower opening directly above the bottom of the partition member 4 with only a gap for the filtrate delivery present. The upper portion of the pipe 9 can lead into another unshown collection chamber. On the other hand, the filtrate delivery pipe 9 can also lead into the collection chamber for the first filtrate delivery pipe 8. The filter element in the drawing is surrounded by a filter means 10, which is fixed to the cover plate with an attachment means 11, to the partition member 4 with an attachment means 12 and to the bottom plate with an attachment means 13. As attachment means 11, 12 and 13 the so called hose clips can be used.

A perforated pipe made from plastic, metal or self-supporting filter means, such as sintered metal or ceramic pipe, can be used as supporting member 7 or supporting member 5.

Figure 2:
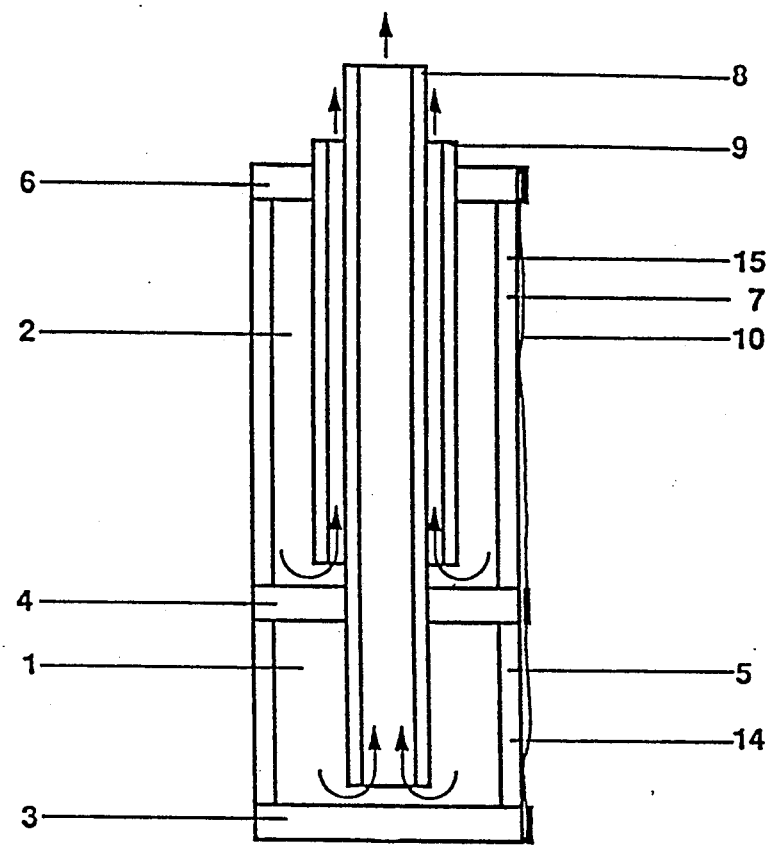
FIG. 2 is a schematic longitudinal cross sectional view through an additional embodiment of the filter element according to the invention shown in operation.

In FIG. 2, an additional embodiment of the invention is shown. In this embodiment, the walls of the chambers 1 and 2, which are of course also supporting members, are made from fluid permeable material 14 and 15, which simultaneously acts as a filter means. The flow of filtrate is shown by the arrows in operation of this filter element. The operation of the embodiment of FIG. 2 is identical to the operation of the embodiment of FIG. 1, except that the filter means 10 is used in the embodiment of FIG. 1, while the fluid permeable material 14 and 15 is used in FIG. 2.

Figure 3:
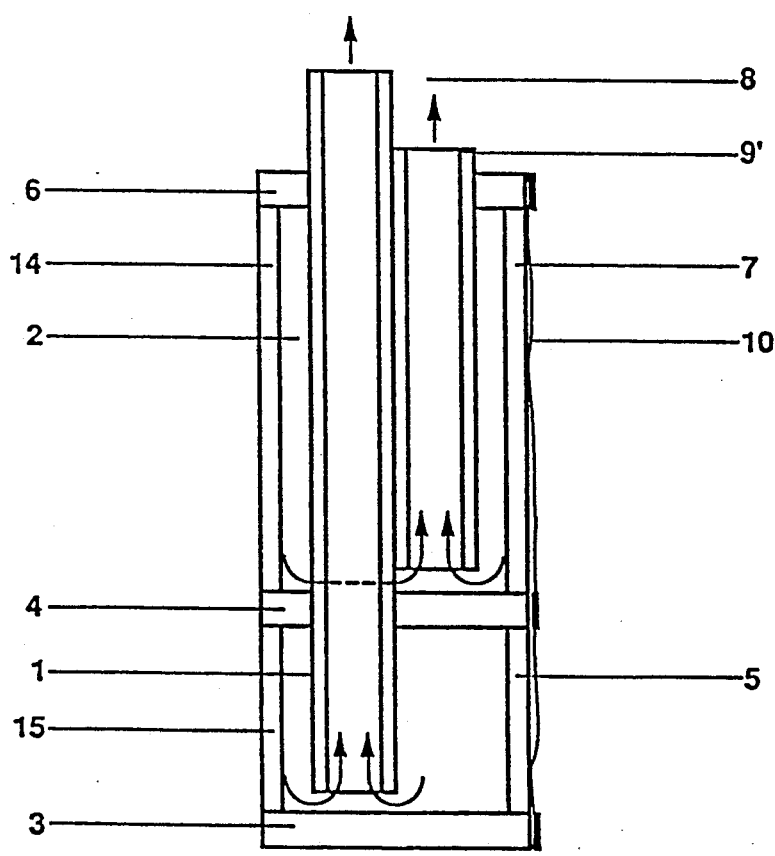
FIG. 3 is a schematic longitudinal cross sectional view through another embodiment of the filter element according to the invention shown in operation.

In the other embodiment shown in FIG. 3 instead of putting one filtrate delivery pipe inside the other, a filtrate delivery pipe 9' is provided for filtrate delivery in the chamber 2 and arranged parallel to the filtrate delivery pipe 8.

The candle filter element according to the invention is used after the main or principal filtration has ended. It is particularly used to separate a residual volume remaining at the bottom of the filter container. The filter element surrounded by suspension, e.g. over its entire height, is at a low pressure applied through the filter delivery pipes 8,9, whereby next the fluid level in the container sinks almost to the height of the partition member 4. Shortly before air or gas is drawn from the chamber 2, the low pressure is cut off, and the residual volume remaining in chamber 1 is filtered from the lower chamber 1. The length of the short lower portion of the filter element is arranged according to the handling of the present filter cake. The chamber 1 can be completely enclosed with a solid.

The delivery of filtrate can occur according to the present state of the art either by overpressure and/or by suction or low pressure. In the first case, one uses a pressurized tank. In the second case, the container must be designed for vacuum or low pressure operation. However, a combination of low pressure and overpressure may also be used.

In the case in which rapidly settling solid products are present in the suspension, the washing can occur with stirring. In that case the filter is equipped with a stirrer, which is surrounded by the filter candle.

The candle chamber can understandably also be used for filtration of light suspendible solid components. Appropriate filter surfaces can be present as required for the desired filter cake structure. Also, in this case the residual volume is almost entirely eliminated.

EXAMPLES

1. Comparative Example 3000 l of a watery suspension, which contains 150 kg of a metal powder with a specific gravity of 2 g/cc with a grain size distribution, which has a maximum at 100 micrometers, is filtered by a 1.2 m$^2$ candle filter with a capacity of about 0.6 m$^3$, which is not structured according to the invention. No complete filter cakes resulted on the candle. The largest portion of the metal powder collects in the bottom of the container under the filter element. The filtration is then ended, when gas flows through the filter elements. At this point, there is about 60% residual volume, including solids in relation to the capacity of the filter. This residual volume is no longer separable.

2. Example of the Invention 3000 l of a water suspension, which contains 150 kg of the metal powder with a specific gravity of 2 g/cc and a grain size distribution with a maximum at 100 micrometers, is filtered with three candle filters according to the invention with a total surface area of 0.63 m$^2$ and a net capacity of 0.6 m$^3$. The total surface area for the residual volume filtration is 0.21 m$^2$.

Date for the candle filter chambers:

| | |
|---|---|
| upper filter surface area | 0.14 m$^2$ |
| lower filter surface area | 0.07 m$^2$ |
| | 0.21 m$^2$ |
| Total candle length | 900 mm |
| upper candle height | 600 mm |
| lower candle length | 300 mm |
| φ of the candle | 80 mm |
| Filter cloth | 30 micrometers |

The largest portion of the metal powder collects on the bottom of the container and increasingly closes the lower portion of the candle. During the filtration the candle is operated for filtrate delivery from both the upper and the lower portions or containers. After breakthrough of the gases in the upper chamber of the filter element, the chamber is shut off and the product is produced as a filter cake. The lower chamber now performs the entire residual volume filtration. One obtains a filter cake, which is almost completely dried. The filter element is completely closed in the vicinity of the lower chamber by product.

The process according to the invention finds a special application with suspension with very rapid sedimentation rates. These are materials whose specific gravity deviates too much from that of the filtrate. In this case, a portion of the solid components may settle, prior to the beginning of the filtration. At the end of the filtration thus the largest portion of the solid material lies outside of the upper candle portion on the bottom of the filter and completely surrounds the short candle portion.

It will be understood that each of the elements described above, or two or more together, may also find a useful application in other types of structures differing from the types described above.

While the invention has been illustrated and described as embodied in a multichamber-candle filter element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Multichamber-candle filter element for filtration of a residual volume of a suspension with rapidly settling solid components, comprising at least two chambers (1,2) positioned in succession above each other, a lowest of the chambers being from ⅓ to 1/10 of a total length of the candle filter element, a separate filtrate delivery pipe (8,9) extending from each of the chambers to provide a separate outlet for filtrate delivery for each of said chambers and a partition member separating individual ones of the chambers from each other in a fluid-tight manner.

2. Multichamber-candle filter element as defined in claim 1, having two of said chambers and two of said filtrate delivery pipes and said filtrate delivery pipes are coaxial, one of said filtrate delivery pipes being located at least partially inside the other of said filtrate delivery pipes.

3. Multichamber-candle filter element as defined in claim 1, wherein the filtrate delivery pipes are positioned side-by-side.

4. Multichamber-candle filter element as defined in claim 1, in which each of the partition members (4) is a plate.

5. Multichamber-candle filter element as defined in claim 1, further comprising a fluid-tight cover plate (6) and a fluid-tight bottom plate (3), the fluid-tight bottom plate providing a bottom closure of the lowest chamber and the fluid-tight cover providing a top closure of a topmost one of the chambers, and fluid permeable walls (14,15).

6. Multichamber-candle filter element as defined in claim 1, further comprising a filter means (10) associated with the chambers.

7. Multichamber-candle filter element for filtration of a residual volume of a suspension with rapidly settling solid components, comprising at least two chambers (1,2) positioned in succession above each other, a lowest of the chambers being from ⅓ to 1/10 of a total length of the candle filter element, and a separate filtrate delivery pipe (8,9) extending from each of the chambers to provide a separate outlet for filtrate delivery for each of the chambers.

8. Multichamber-candle filter element as defined in claim 7, in which adjacent individual ones of the chambers are separated from each other in a fluid-tight manner by a partition member.

9. Multichamber-candle filter element as defined in claim 8, in which each of the partition members is a plate.

10. Multichamber-candle filter element as defined in claim 8, having two of said chambers and two of said filtrate delivery pipes, and said filtrate delivery pipes are coaxial, one of said filtrate delivery pipes being extending at least partially inside the other of said filtrate delivery pipes.

11. Multichamber-candle filter element as defined in claim 8, wherein the filtrate delivery pipes are positioned side-by-side.

12. Multichamber-candle filter element for filtration of a residual volume of a suspension with rapidly settling solid components, comprising two chambers (1,2) positioned in succession above each other and a separate filtrate delivery pipe (8,9) extending from each of the chambers for filtrate delivery to provide a separate outlet for each of said chambers.

13. Method of filtration of a residual volume of a suspension with rapidly settling solid components comprising the steps of:
   a. providing at least one multichamber-candle filter element in the suspension, said multichamber-candle filter element comprising an upper and a lower chamber (1,2) arranged above each other, the lower chamber being from ⅓ to 1/10 of a total length of the candle filter element, and a filter delivery pipe (8,9) extending from each of the chambers to provide a separate outlet for each of said chambers for filtrate delivery;
   b. operating the multichamber-candle filter element for filtrate delivery from both the upper and the lower chambers through both filtrate delivery pipes;
   c. after breakthrough of gases in the upper chamber of the filter element, shutting off the upper chamber; and
   d. after the shutting off of the upper chamber, continuing the filtration using the lower chamber only.

* * * * *